(12) United States Patent
Seo et al.

(10) Patent No.: US 12,008,180 B2
(45) Date of Patent: Jun. 11, 2024

(54) DISPLAY DEVICE INCLUDING A FINGERPRINT SENSOR

(71) Applicant: SAMSUNG DISPLAY CO., LTD., Yongin-si (KR)

(72) Inventors: Su Yul Seo, Incheon (KR); Ji Hun Ryu, Hwaseong-si (KR); Kwang Hyun Baek, Asan-si (KR); Kyung Min Choi, Seoul (KR); Won Ki Hong, Suwon-si (KR); Jeong An Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/819,944

(22) Filed: Aug. 15, 2022

(65) Prior Publication Data

US 2023/0185390 A1  Jun. 15, 2023

(30) Foreign Application Priority Data

Dec. 13, 2021 (KR) ........................ 10-2021-0177703

(51) Int. Cl.
*G06F 3/041* (2006.01)
*G06V 40/13* (2022.01)

(52) U.S. Cl.
CPC ........ *G06F 3/0412* (2013.01); *G06V 40/1306* (2022.01)

(58) Field of Classification Search
CPC ............ G06V 40/1306; G06V 40/1318; G06F 3/0412
See application file for complete search history.

(56) References Cited

U.S. PATENT DOCUMENTS

2018/0046359 A1* 2/2018 Kim ...................... G06F 3/0488

FOREIGN PATENT DOCUMENTS

| KR | 10-2020-0049403 | 5/2002 |
| KR | 10-2020-0002048 | 1/2020 |
| KR | 10-2021-0005412 | 1/2021 |
| KR | 10-2021-0014812 | 2/2021 |

* cited by examiner

*Primary Examiner* — Yaron Cohen
(74) *Attorney, Agent, or Firm* — F. Chau & Associates, LLC

(57) ABSTRACT

A display device includes a display panel. A metal plate is disposed on a bottom surface of the display panel and includes a first surface facing the bottom surface of the display panel and a second surface opposite to the one surface. A fingerprint sensor overlaps the second surface of the metal plate. The metal plate includes a recess that is recessed in a direction from the second surface of the metal plate toward the first surface.

20 Claims, 13 Drawing Sheets

DISPLAY DEVICE INCLUDING A FINGERPRINT SENSOR

CROSS-REFERENCE TO RELATED APPLICATION

This application claims priority under 35 U.S.C. § 119 to Korean Patent Application No. 10-2021-0177703, filed on Dec. 13, 2021 in the Korean Intellectual Property Office, the contents of which are herein incorporated by reference in its entirety.

TECHNICAL FIELD

The present disclosure relates to a display device and, more specifically, to a display device including a fingerprint sensor.

DISCUSSION OF THE RELATED ART

Display devices are a widely component in electronic devices, for example, smartphones, tablet computers, notebook/laptop computers, computer monitors, televisions, etc. Recently, with the proliferation of mobile communications, the use of portable electronic devices, such as smartphones, tablet computers, and notebook/laptop computers, has been greatly increased. Private personal information may be stored in the portable electronic devices. Therefore, to protect the private personal information in the portable electronic devices, fingerprint verification for verifying a fingerprint, which is user's biometric information, may be used. To this end, a display device may include a fingerprint sensor for fingerprint verification.

The fingerprint sensor may be implemented as, for example, an optical fingerprint sensor, an ultrasonic fingerprint sensor, a capacitive fingerprint sensor, or the like. The fingerprint sensor may be disposed below a display panel of a display device and several elements may be disposed between the display panel and the fingerprint sensor. An incident signal transmitted from the fingerprint sensor may be reflected from the user's fingerprint and received back by the fingerprint sensor in the form of a reflection signal.

SUMMARY

A display device includes a display panel. A metal plate is disposed on a bottom surface of the display panel, the metal plate having a first surface facing the bottom surface of the display panel, a second surface facing away from the display panel, and a recess disposed on the second surface of the metal plate. A fingerprint sensor is disposed on the second surface of the metal plate, overlapping the recess of the metal plate.

A display device includes a display panel. A metal plate is disposed on a bottom surface of the display panel and includes a top surface facing the bottom surface of the display panel and a bottom surface opposite to the top surface;. A fingerprint sensor is disposed on the bottom surface of the metal plate. The metal plate includes a recess recessed in a direction from the bottom surface of the metal plate in a direction toward the top surface of the metal plate. The fingerprint sensor overlaps the recess. A roughness of the bottom surface of the metal plate where the recess is formed is greater than a roughness of the bottom surface of the metal plate where the recess is not formed.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
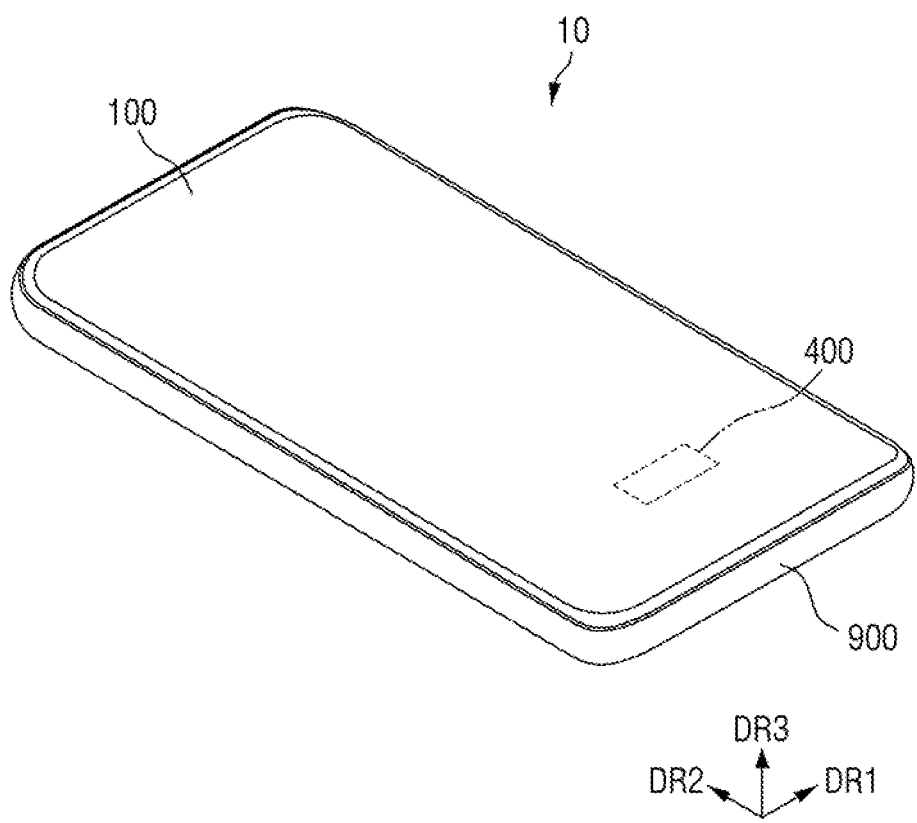
FIG. 1 is a perspective view illustrating a display device according to an embodiment of the present disclosure.

Embodiments of the present invention are shown in the figures and described herein. While it is to be understood that the various embodiments shown and described do represent particular implementations of the present invention, variations of the embodiments shown are still within the spirit and scope of the present invention.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification and figures, the same reference numerals may refer to the same or like parts.

It will be understood that, although the terms "first," "second," "third" etc. may be used herein to describe various elements, components, regions, layers and/or sections, these elements, components, regions, layers and/or sections should not necessarily be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"Approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "approximately" can mean within one or more standard deviations, or within ±30%, 20%, 10% or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not necessarily be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. However, it is noted that the drawings do represent at least some embodiments of the present invention and may be understood as having been drawn to scale with respect to these embodiments. Accordingly, the relative sizes, shapes, angles, thicknesses, etc. shown in the figures should be considered part of this disclosure.

Hereinafter, embodiments of the present disclosure will be described with reference to the attached drawings.

Figure 2:
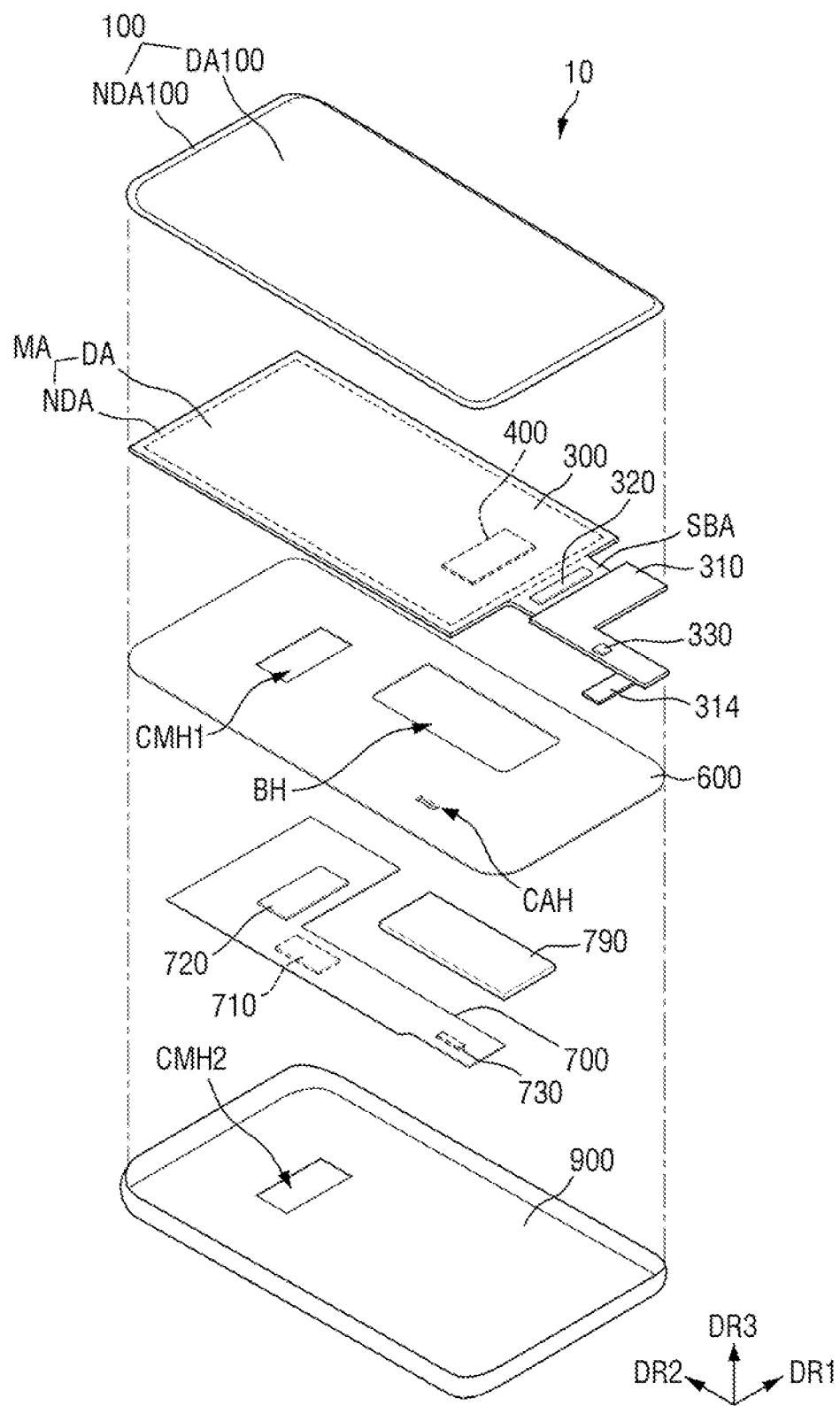
FIG. 2 is an exploded perspective view illustrating a display device according to an embodiment of the present disclosure.

FIG. 1 is a perspective view illustrating a display device according to an embodiment of the present disclosure. FIG. 2 is an exploded perspective view illustrating a display device according to an embodiment of the present disclosure.

Referring to FIGS. 1 and 2, a display device, 10 according to an embodiment, may be applicable to a portable electronic device, such as a mobile phone, a smartphone, a tablet computer, a mobile communication terminal, an electronic notebook, an electronic book, a portable multimedia players (PMP), a navigation system, and an ultra mobile PC (UMPC). Alternatively, the display device 10, according to an embodiment, may be applicable to a display unit of a television, a notebook PC, a monitor, a billboard, or an Internet of Things (IoT) device. Alternatively, the display device 10, according to an embodiment, may be applicable to a wearable device, such as a smart watch, a watch phone, an eyeglass display, and a head mounted displays (HMD). Alternatively, the display device 10, according to an embodiment, may be applicable to a vehicle center fascia, a center information display (CID) placed in a vehicle instrument panel, a room mirror display replacing a car side mirror, or a display placed on a back surface of a front seat as an entertainment device for a back seat of a vehicle.

In this specification, a first direction DR1 is a direction parallel to a pair of short sides of the display device 10, for example, and may be a horizontal direction of the display device 10. A second direction DR2 is a direction parallel to a pair of long sides of the display device 10, for example, and may be a vertical direction of the display device 10. A third direction DR3 may be a thickness direction of the display device 10.

The display device 10 may have a planar shape similar to a quadrilateral shape. For example, as shown in FIG. 1, the display device 10 may have a planar shape similar to a quadrilateral planar shape having a pair of short sides in the first direction DR1 and a pair of long sides in the second direction DR2. A corner at which a long side in the first direction DR1 meets a short side in the second direction DR2 may be rounded to have a certain curvature or may be formed at a right angle. A planar shape of the display device 10 is not necessarily limited to a quadrilateral shape and may be formed in another shape such as a polygonal shape, a circular shape, or an elliptical shape.

The display device 10 may be flat. Alternatively, the display device 10 may have one or more bent sides. For example, the display device 10 may be formed such that left and right sides thereof are bent back (e.g., having rounded sides). Alternatively, the display device 10 may have upper, lower, left, and right sides are all bent back.

The display device 10, according to an embodiment, includes a cover window 100, a display panel 300, a display circuit board 310, a display driver circuit 320, a fingerprint sensor 400, a bracket 600, a main circuit board 700, and a lower cover 900.

The cover window 100 may be disposed on a front surface of the display panel 300 so as to at least partially cover the front surface of the display panel 300. Thus, the cover window 100 may protect a top surface of the display panel 300 from external damage.

The cover window 100 may include a transmissive portion DA100, that is transmissive of visible light, ultraviolet light, and/or infrared, corresponding to the display panel 300 and a light shielding portion NDA100, that blocks visible light, ultraviolet light, and/or infrared light, corresponding to an area other than the display panel 300. The light shielding portion NDA 100 may be opaque. Alternatively, the light shielding portion NDA100 may be a decorative layer having an observable pattern.

The display panel 300 may be disposed under the cover window 100. The display panel 300 may be a light emitting display panel including light emitting elements. For example, the display panel 300 may be an organic light emitting diode (OLED) display panel that uses organic light emitting diodes.

The display panel 300 may include a main area MA and a sub-area SBA.

The main area MA may include a display area DA in which an image is displayed and a non-display area NDA that is an area peripheral to the display area DA (e.g., the non-display area NDA at least partially surrounds the display area DA). The display area DA may include display pixels SP (see FIG. 3) for displaying an image. The non-display area NDA may be defined as an area extending from edges of the display area DA to the edge of the display panel 300.

The display area DA may include a fingerprint recognition area. The fingerprint recognition area refers to an area in which the fingerprint sensor 400 is disposed. The fingerprint recognition area may be a portion of the display are DA as shown in FIG. 2. The fingerprint sensor 400 may include, for example, an optical fingerprint sensor, an ultrasonic fingerprint sensor, or a capacitive fingerprint sensor. Hereinafter, embodiments in which an ultrasonic fingerprint sensor is applied as the fingerprint sensor 400 will be mainly described.

The planar shape of the main area MA of the display panel 300 may be rectangular. For example, the planar shape of the main area MA may be a rectangular shape in which corners have a right angle. However, the present disclosure is not necessarily limited thereto, and the planar shape of the main area MA may be a rectangular shape with rounded corners (e.g., a rounded rectangle).

The sub-area SBA may protrude from one side of the main area MA in the second direction DR2. The length of the sub-area SBA in the first direction DR1 may be smaller than the length of the main area MA in the first direction DR1 and the length of the sub-area SBA in the second direction DR2 may be smaller than the length of the main area MA in the second direction DR2. However, the present disclosure is not necessarily limited thereto.

Although it is shown in FIG. 2 that the sub-area SBA is in an unfolded state (e.g., a planar shape), the sub-area SBA may be bent, and in this case, the sub-area SBA may be disposed on a bottom surface of the display panel 300. When the sub-area SBA is bent, the sub-area SBA may overlap the main area MA in the thickness direction DR3 of a substrate SUB. The sub-area SBA may include the display circuit board 310 and the display driver circuit 320 disposed thereon.

The display circuit board 310 may be attached onto one end of the sub-area SBA of the display panel 300 by using an electrically conductive adhesive member, such as an anisotropic conductive film. Accordingly, the display circuit board 310 may be electrically connected to the display panel 300 and the display driver circuit 320. The display panel 300 and the display driver circuit 320 may receive digital video data, timing signals, and driving voltages through the display circuit board 310. The display circuit board 310 may be a flexible printed circuit board, a printed circuit board, or a flexible film, such as a chip on film.

The display driver circuit 320 may generate signals and voltages for driving the display panel 300. The display driver circuit 320 may be formed as an integrated circuit (IC) and may be attached onto the display panel 300 in the sub-area SBA in a chip-on-glass (COG), chip-on-plastic (COP), or ultrasonic bonding manner, but the present disclosure is not necessarily limited thereto. For example, the display driver circuit 320 may be mounted on the display circuit board 310 in a chip-on-film (COF) manner.

A touch driving circuit 330 may be disposed on the display circuit board 310. The touch driving circuit 330 may be formed as an integrated circuit and attached onto the top surface of the display circuit board 310.

Alternatively, a power supply unit may be additionally disposed on the display circuit board 310 to supply display driving voltages for driving the display driver circuit 320.

The display sensor 400 may be disposed on the bottom surface of the display panel 300. The fingerprint sensor 400 may be disposed on the bottom surface of the display panel 300 using a fifth coupling member which will be described below.

A bracket 600 may be disposed under the display panel 300. The bracket 600 may include plastic, metal, or both plastic and metal. The bracket 600 may include a first camera hole CMH1 into which a camera device 720 is inserted, a battery hole BH in which a battery is disposed, and a cable hole CAH through which a cable 314 connected to the display circuit board 310 passes.

The main circuit board 700 and the battery 790 may be disposed under the bracket 600. The main circuit board 700 may be a printed circuit board or a flexible printed circuit board.

The main circuit board 700 may include a main processor 710, the first camera sensor 720, and a main connector 730. The first camera sensor 720 may be disposed on a top surface and a bottom surface of the main circuit board 700, the main processor 710 may be disposed on the top surface of the main circuit board 700, and the main connector 730 may be disposed on the bottom surface of the main circuit board 700.

The main processor 710 may control functions of the display device 10. For example, the main processor 710 may output digital video data to the display driver circuit 320 through the display circuit board 310 so that the display panel 300 can display an image. In addition, the main processor 710 may receive touch data from the touch driver circuit 330, determine a user's touch coordinates, and then execute an application indicated by an icon displayed at the user's touch coordinates. Also, the main processor 710 may convert first image data input from the first camera sensor 720 into digital video data and output the digital video data to the display driver circuit 320 through the display circuit board 310, thereby displaying an image photographed by the first camera sensor 720 on the display panel 300.

The first camera sensor 720 processes an image frame such as a still image or a moving image obtained by the image sensor and outputs the processed image frame to the main processor 710. The first camera sensor 720 may be a CMOS image sensor or a CCD sensor. The first camera sensor 720 may be exposed to a bottom surface of the lower cover 900 by the second camera hole CMH2, and thus an object or background disposed under the display device 10 may be photographed.

The cable 314, having passed through the cable hole CAH of the bracket 600, may be connected to the main connector 730. Thus, the main circuit board 700 may be electrically connected to the display circuit board 310.

The battery 790 might not overlap the main circuit board 700 in the third direction DR3. The battery 790 may overlap the battery hole BH of the bracket 600. In addition, the fingerprint sensor 400 may also overlap the battery hole BH of the bracket 600.

Additionally, the main circuit board 700 may further include a mobile communication module configured to transmit and receive radio signals with at least one of a base station, an external terminal, or a server on a mobile communication network. The radio signals may include any of various types of data according to transmission and reception of a voice call signal, a video call signal, or a text/multimedia message.

The lower cover 900 may be disposed under the main circuit board 700 and the battery 790. The lower cover 900 may be engaged and fixed to the bracket 600. The lower cover 900 may form a bottom surface appearance of the display device 10. In an embodiment, the lower cover 900 may include plastic, metal, or both plastic and metal.

The lower cover 900 may be provided with the second camera hole CMH2 through which a bottom surface of the first camera sensor 720 is exposed. However, the position of the first camera sensor 720 and the positions of the first and second camera holes CMH1 and CMH2 corresponding to the first camera sensor 720 are not necessarily limited to the embodiment shown in FIG. 2.

Figure 3:
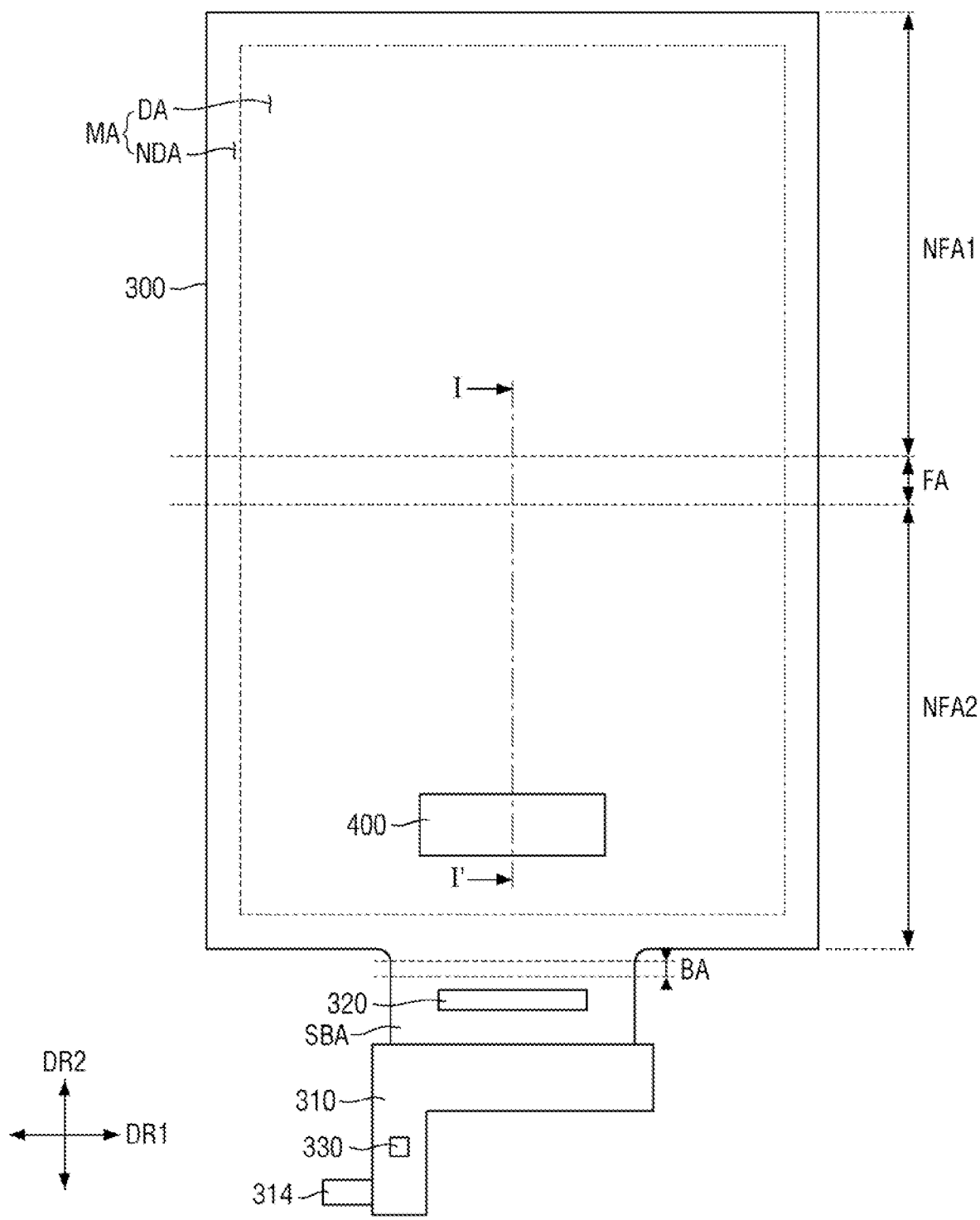
FIG. 3 is a plan view illustrating a display panel, a display circuit board, and a display driver circuit of FIG. 2.

FIG. 3 is a plan view illustrating a display panel, a display circuit board, and a display driver circuit of FIG. 2.

Referring to FIG. 3, a folding area FA and non-folding areas NFA1 and NFA2 may be further defined in the display device. The folding area FA may have a line shape extending along the first direction DR1. A first non-folding area NFA1 may be disposed on a first side of a folding area FA in the second direction DR2. A second non-folding area NFA2 may be disposed on a second side of the folding area FA in the second direction DR2. The area of each of the non-folding areas NFA1 and NFA2 may be greater than the area of the folding area FA, but is not necessarily limited thereto.

The display device may be a foldable display device that is foldable with respect to the folding area FA while the non-folding areas NFA1 and NFA2 remain in an unfolded (e.g., planar) state. The display device may be an in-foldable display device which is infolded such that a top surface of the first non-folding area NFA1 of the display device and a top surface of the second non-folding area NFA2 of the display device face each other with respect to the folding area FA, or may be an out-foldable display device which is outfolded such that a bottom surface of the first non-folding area NFA1 of the display device and a bottom surface of the second non-folding area of the display device face each other with respect to the folding area FA.

The fingerprint sensor 400 may be disposed in the second non-folding area NFA2, as shown in FIG. 3. However, the present disclosure is not necessarily limited thereto, such that the fingerprint sensor 400 may be disposed in the first non-folding area NFA1 or in the folding area FA.

Figure 4:
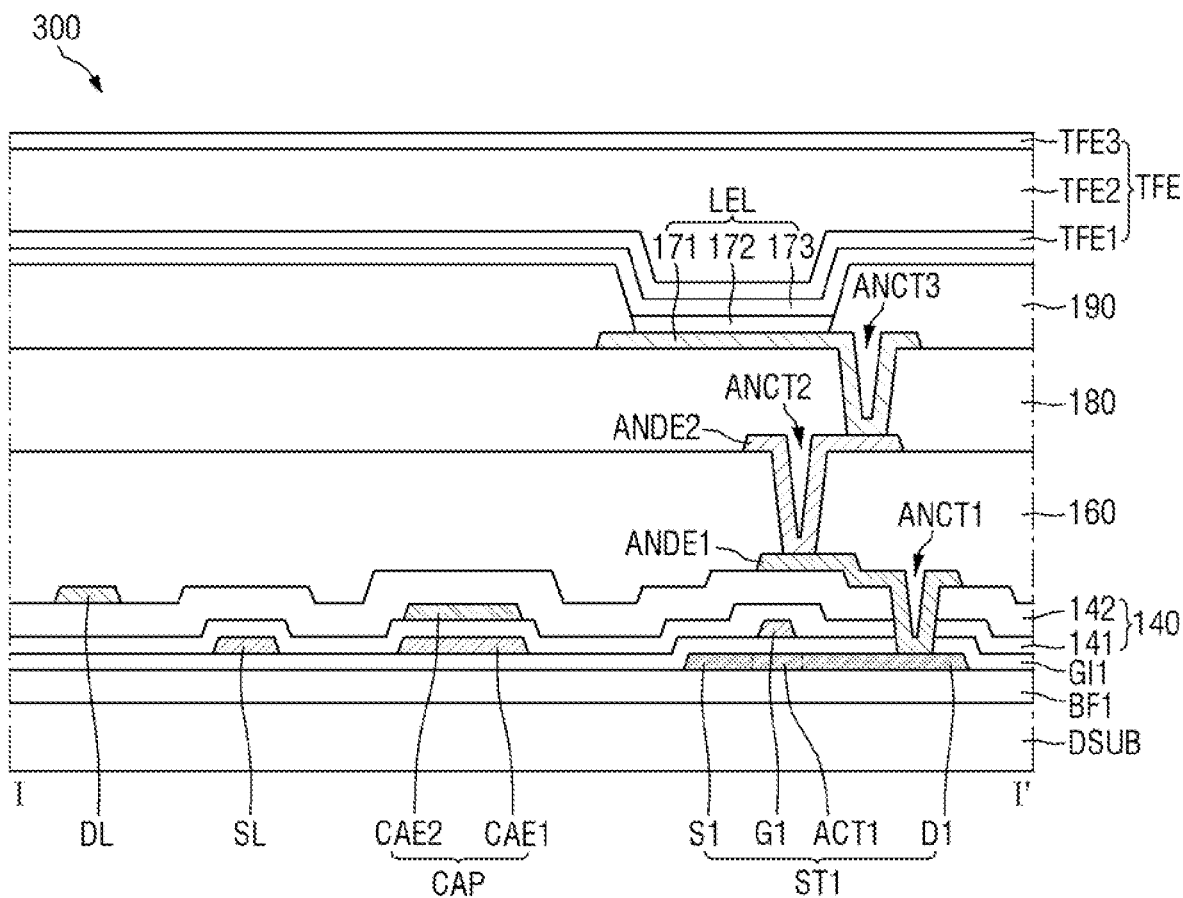
FIG. 4 is an exemplary cross-sectional view illustrating the display panel of FIG. 3.

FIG. 4 is an exemplary cross-sectional view illustrating the display panel of FIG. 3.

Referring to FIG. 4, the display panel 300 may include display pixels for displaying an image. Each of the display pixels SP may include a light emitting element LEL, a first thin-film transistor ST1, and a capacitor CAP.

A display substrate DSUB may be made of an electrically insulating material (e.g., a dielectric), such as glass or polymer resin. For example, the display substrate DSUB may include polyimide. The display substrate DSUB may be a flexible substrate that can be bent, folded, or rolled.

The display substrate DSUB may include, for example, a plurality of organic layers and a plurality of inorganic layers. For example, the display substrate DSUB may include a first organic layer, a first barrier layer disposed on the first organic layer and including at least one inorganic layer, a second organic layer disposed on the first barrier layer, and a second barrier layer disposed on the second organic layer and including at least one inorganic layer.

A first buffer layer BF1 may be disposed on the display substrate DSUB. The first buffer layer BF1 protects thin-film transistors of a thin-film transistor layer TFTL and a light emitting layer 172 of the light emitting element layer from moisture introduced through the display substrate DSUB, which may be vulnerable to moisture penetration. The first buffer layer BF1 may be composed of a plurality of inorganic layers stacked alternately. For example, the first buffer layer BF1 may be a multilayer in which one or more inorganic layers may include, for example, a silicon nitride layer, a silicon oxynitride layer, a silicon oxide layer, a titanium oxide layer, and an aluminum oxide layer are alternately stacked.

A first active layer ACT1, a first source electrode S1, and a first drain electrode D1 of the first thin-film transistor ST1 may be disposed on the first buffer layer BF1. The first active layer ACT1 of the first thin-film transistor ST1 may include, for example, polycrystalline silicon, monocrystalline silicon, low-temperature polycrystalline silicon, amorphous silicon, or an oxide semiconductor. The first source electrode S1 and the first drain electrode D1 may have electrical conductivity by doping a silicon semiconductor or an oxide semiconductor with ions or impurities. The first active layer ACT1 may overlap a first gate electrode G1 in the third direction DR3, which is the thickness direction of the display substrate DSUB, and the first source electrode S1 and the first drain electrode D1 might not overlap the first gate electrode G1 in the third direction DR3.

A first gate insulating layer GI1 may be disposed on the first active layer ACT1 of the first thin-film transistor ST1. The first gate insulating layer GI1 may be an inorganic layer such as, for example, a silicon nitride layer, a silicon oxynitride layer, a silicon oxide layer, a titanium oxide layer, or an aluminum oxide layer.

The first gate electrode G1 of the first thin-film transistor ST1, a first capacitor electrode CAE1, and scan lines SL may be disposed on the first gate insulating layer GI1. The first gate electrode G1 may overlap the first active layer ACT1 in the third direction DR3. The scan lines SL may be electrically connected to the first gate electrode G1. The first capacitor electrode CAE1 may overlap a second capacitor electrode CAE2 in the third direction DR3. The first gate electrode G1 and the scan lines SL may be a single layer or a multilayer including molybdenum (Mo), aluminum (Al), chromium (Cr), gold (Au), titanium (Ti), nickel (Ni), neodymium (Ne), copper (Cu), and/or alloys of the same.

A first interlayer insulating film 141 may be disposed on the first gate electrode G1 and the first capacitor electrode CAE1. The first interlayer insulating film 141 may be an inorganic layer such as, for example, a silicon nitride layer, a silicon oxynitride layer, a silicon oxide layer, a titanium oxide layer, or an aluminum oxide layer.

The second capacitor electrode CAE2 may be disposed on the first interlayer insulating film 141. Since the first interlayer insulating film 141 has a predetermined dielectric constant, the first capacitor electrode CAE1, the second capacitor electrode CAE2, and the first interlayer insulating film 141 disposed between the first capacitor electrode CAE1 and the second capacitor electrode CAE2 may form a capacitor. The second capacitor electrode CAE2 may be a single layer or a multilayer including, for example, molybdenum (Mo), aluminum (Al), chromium (Cr), gold (Au), titanium (Ti), nickel (Ni), neodymium (Ne), copper (Cu), and/or alloys of the same.

A second interlayer insulating film 142 may be disposed on the second capacitor electrode CAE2. The second interlayer insulating film 142 may be an inorganic layer such as, for example, a silicon nitride layer, a silicon oxynitride layer, a silicon oxide layer, a titanium oxide layer, or an aluminum oxide layer. The second interlayer insulating film 142 may include a plurality of inorganic layers.

A first pixel connection electrode ANDE1 and data lines DL may be disposed on the second interlayer insulating film 142. The first pixel connection electrode ANDE1 may be connected to the first drain electrode D1 of the first thin-film transistor ST1 through a first pixel contact hole ANCT1 penetrating the first interlayer insulating film 141 and the second interlayer insulating film 142 to expose the first drain electrode D1 of the first thin-film transistor ST1. The first pixel connection electrode ANDE1 may be a single layer or a multilayer made of, for example, molybdenum (Mo), aluminum (Al), chromium (Cr), gold (Au), titanium (Ti), nickel (Ni), neodymium (Nd), copper (Cu), and/or alloys of the same.

A first organic layer 160 for planarization may be disposed on the first pixel connection electrode ANDE1. The first organic layer 160 may be formed of, for example, acryl resin, epoxy resin, phenolic resin, polyamide resin, polyimide resin, or the like.

A second pixel connection electrode ANDE2 may be disposed on the first organic layer 160. The second pixel connection electrode ANDE2 may be connected to the first pixel connection electrode ANDE1 through a second pixel contact hole ANCT2 penetrating the first organic layer 160 to expose the first pixel connection electrode ANDE1. The second pixel connection electrode ANDE2 may be a single layer or a multilayer made of, for example, molybdenum (Mo), aluminum (Al), chromium (Cr), gold (Au), titanium (Ti), nickel (Ni), neodymium (Nd), copper (Cu), and/or alloys of the same.

A second organic layer 180 may be disposed on the second pixel connection electrode ANDE2. The second organic layer 180 may be formed of, for example, acryl resin, epoxy resin, phenolic resin, polyamide resin, polyimide resin, or the like.

In an embodiment, the second pixel connection electrode ANDE2 and the second organic layer 180 may be omitted. In this case, the first pixel connection electrode ANDE1 may be directly connected to a first light emitting electrode 171.

In FIG. 4, the first thin-film transistor ST1 is formed as a top-gate type in which the first gate electrode G1 is located above the first active layer ACT1. However, the present disclosure is not necessarily limited thereto. The first thin-film transistor ST1 may be formed as a bottom-gate type in which the first gate electrode G1 is located under the first active layer ACT1, or a double-gate type in which the first gate electrode G1 is located both above and under the first active layer ACT1.

The light emitting elements LEL and a bank 190 may be disposed on the second organic layer 180. Each of the light emitting elements LEL includes the light emitting electrode 171, the light emitting layer 172, and a common light emitting electrode 173.

The light emitting electrode 171 may be formed on the second organic layer 180. The light emitting electrode 171 may be connected to the second pixel connection electrode ANDE2 through a third pixel contact hole ANCT3 penetrating the second organic layer 180 to expose the second pixel connection electrode ANDE2.

In a top emission structure, in which light is emitted in a direction from the light emitting layer 172 toward the common light emitting electrode 173, the light emitting electrode 171 may be made of a metal material having high reflectivity, such as, for example, a stacked structure (Ti/Al/Ti) of aluminum and titanium, a stacked structure (ITO/Al/ITO) of aluminum and indium tin oxide (ITO), an APC alloy, or a stacked structure (ITO/APC/ITO) of an APC alloy and indium tin oxide. The APC alloy is an alloy of silver (Ag), palladium (Pd), and copper (Cu).

The bank 190 may be formed on the second organic layer 180 to separate the light emitting electrode 171 from another light emitting electrode 171 so as to define an emission area. The bank 190 may at least partially cover edges of the light emitting electrode 171. The bank 190 may be an organic layer such as, for example, acryl resin, epoxy resin, phenolic resin, polyamide resin, or polyimide resin.

The emission area EA is an area in which the light emitting electrode 171, the light emitting layer 172, and the common light emitting electrode 173 are sequentially stacked so that holes from the light emitting electrode 171 and electrons from the common light emitting electrode 173 combine together in the light emitting layer 172 to emit light.

The light emitting layer 172 is formed on the light emitting electrode 171 and the bank 190. The light emitting layer 172 may include an organic material configured to emit light of a predetermined color. For example, the light emitting layer 172 may include a hole transporting layer, an organic material layer, and an electron transporting layer.

The common light emitting electrode 173 is formed on the light emitting layer 172. The common light emitting electrode 173 may at least partially cover the light emitting layer 172. The common light emitting electrode 173 may be a common layer common to all emission areas. A capping layer may be formed on the common light emitting electrode 173.

In the top emission structure, the common light emitting electrode 173 may be made of a transparent conductive material (TCO) capable of transmitting light, such as ITO or indium zinc oxide (IZO), or a semi-transmissive conductive material such as magnesium (Mg), silver (Ag) or an alloy of Mg and Ag.

An encapsulation layer TFE may be disposed on the common light emitting electrode 173. The encapsulation layer TFE includes at least one inorganic layer which may prevent or reduce oxygen or moisture from penetrating into the light emitting layer EML. In addition, the encapsulation layer TFE includes at least one organic layer to protect the light emitting element layer EML from foreign substances such as dust. For example, the encapsulation layer TFE includes a first encapsulation inorganic layer TFE1, an encapsulation organic layer TFE2, and a second encapsulation inorganic layer TFE3.

In one embodiment, the display panel 300 is an organic light emitting display panel using organic light emitting didoes, but is not necessarily limited thereto. The display panel 300 may be a micro light emitting diode display panel using a micro light emitting diode (LED), a quantum dot light emitting display panel including a quantum dot light emitting layer, or an inorganic light emitting display panel using an inorganic light emitting element including inorganic semiconductors.

Figure 5:
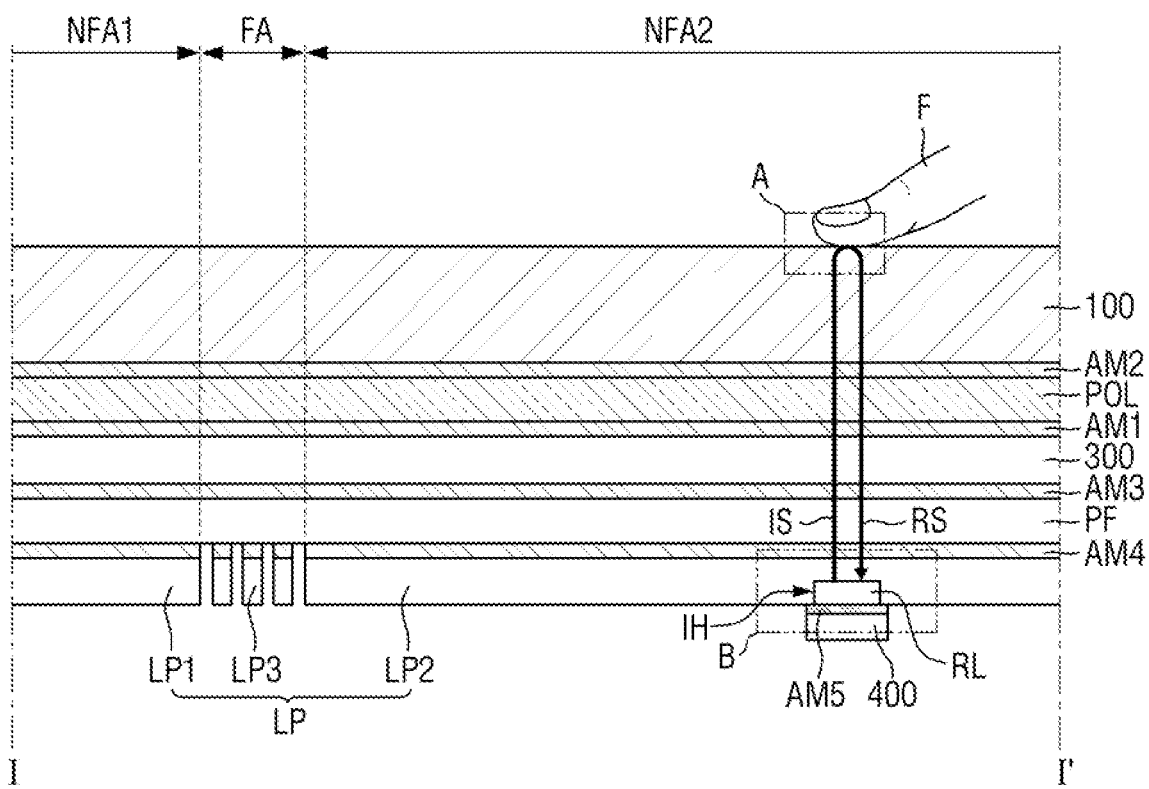
FIG. 5 is a cross-sectional view taken along line I-I' of FIG. 3.
Figure 6:
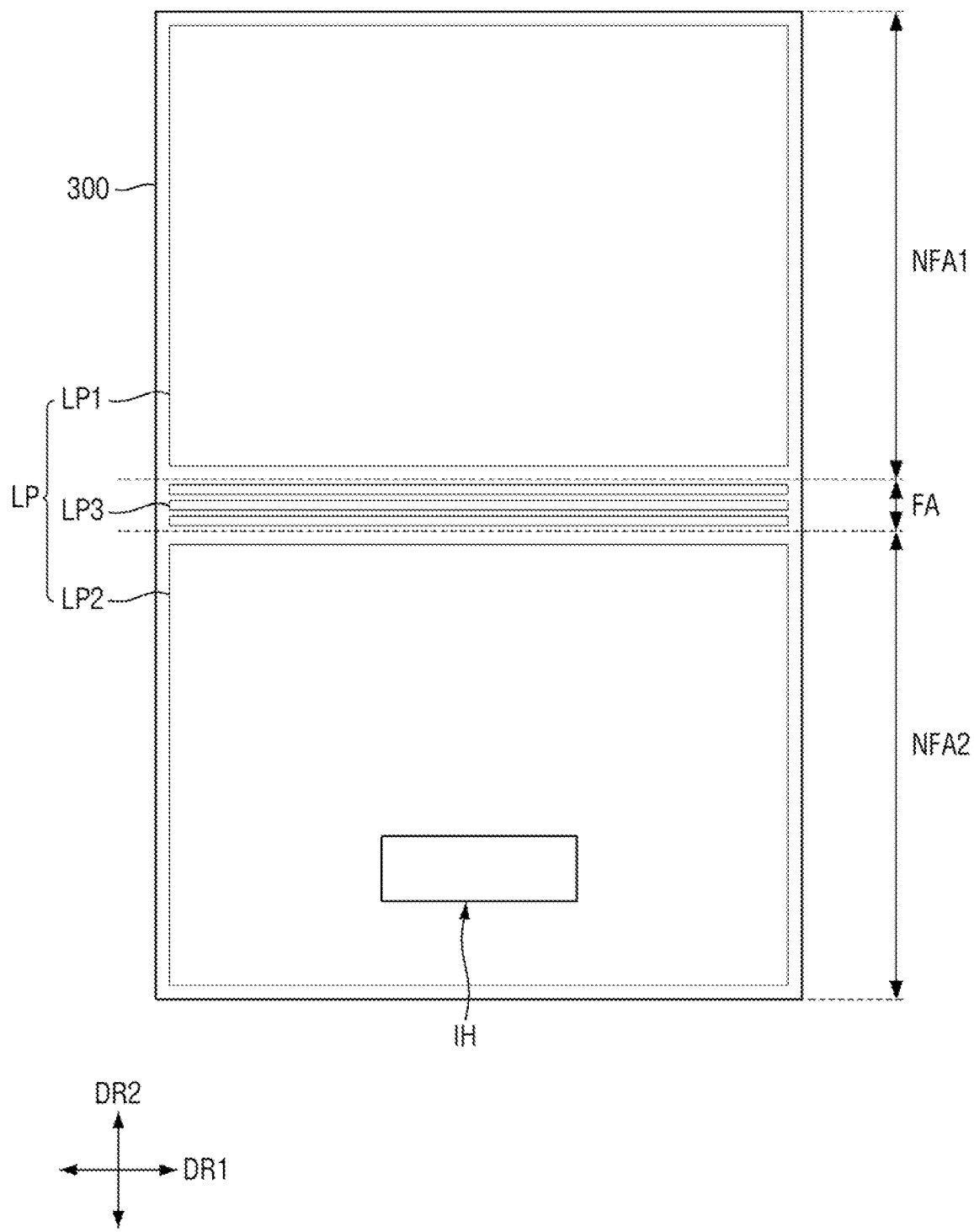
FIG. 6 is a plan view illustrating a lower metal sheet and a filling member according to an embodiment of the present disclosure.

FIG. 5 is a cross-sectional view taken along line I-I' of FIG. 3. FIG. 6 is a plan view illustrating a lower metal sheet and a filling member according to an embodiment of the present disclosure. FIG. 5 illustrates an example in which a user touches the top surface of the cover window 100 with a finger for fingerprint recognition.

Referring to FIG. 5, the display device may include a polarization layer POL, a cover window 100, a metal plate LP, a filling member RL, and coupling members AM1 to AM5 for coupling adjacent members. Among the coupling members AM1 to AM5, first to fourth coupling members AM1 to AM4 may be pressure sensitive adhesives (PSAs), and a fifth coupling member AM5 may be a transparent adhesive resin, such as an optically clear resin (OCR). However, the present disclosure is not necessarily limited thereto, and the fourth coupling member AM1 to AM4 may include an OCR or an optically clear adhesive (OCA), and the fifth coupling member AM5 may be a PSA, an OCA, and/or a colored adhesive resin.

As used herein, a filling member may be referred to more simply as a "filling" and a coupling member may be referred to more simply as a "coupling."

The polarization layer POL may be disposed above the display panel 300. The polarization layer POL may be attached to the top surface of the display panel 300 via the first coupling member AM1. The polarization layer POL may reduce reflection of external light incident through the cover window 100.

The cover window 100 may be disposed on a top surface of the polarization layer POL. The cover window 100 may be attached to the top surface of the polarization layer POL via the second coupling member AM2. In some embodiments, the polarization layer POL may be omitted. In some embodiments in which the polarization layer POL is omitted, color filters and a black matrix disposed between adjacent color filters may be disposed between the cover window 100 and the display panel 300.

A protective layer PF may be disposed on the bottom surface of the display panel 300. The protective layer PF may include polyimide (PI), polyethylene terephthalate (PET), or the like, but is not necessarily limited to these materials. The protective layer PF may be attached to the bottom surface of the display panel 300 via the third coupling member AM3.

When the display panel 300, according to an embodiment, is a top emission display panel, the light transmittance of the third coupling member AM3 may be lower than the light transmittance of the first and second coupling members AM1 and AM2 described above, but the present disclosure is not necessarily limited thereto.

The metal plate LP may be disposed on a lower portion of the protective layer PF. The metal plate LP may be attached to a bottom surface of the protective layer PF via the fourth coupling member AM4. The metal plate LP may include a first metal plate LP disposed in the first non-folding area NFA1, a second metal plate LP2 disposed in the second non-folding area NFA2, and a third metal plate LP3 formed by a plurality of patterns and disposed in the folding area FA. The first and second metal plates LP2 and LP2 support the display panel 300 in the non-folding areas NFA1 and NFA2, respectively. The first and second metal plates LP1 and LP2 may each have a cylindrical pattern shape. The metal plate LP may be made of metal or a metal alloy. For example, the metal plate LP may be made of an aluminum alloy or a stainless steel alloy, but the material thereof is not necessarily limited thereto. In some embodiments, the third metal plate LP3 may be omitted. Although it is illustrated in the drawings that the first to third metal plates LP1, LP2, and LP3 are spaced apart from each other, the present disclosure is not necessarily limited thereto. For example, the first to third metal plates LP1, LP2, and LP3 may be integrally formed and coupled.

A recess IH at least partially surrounded by materials constituting the second metal plate LP2 may be further defined. The recess IH may be at least partially surrounded by materials constituting the second metal plate LP2 in a plan view. The recess IH may be recessed in a direction from a bottom surface LP2a (see FIG. 8) of the second metal plate LP2 toward a top surface thereof (a surface facing the fourth coupling member AM4).

The filling member RL may be disposed within the recess IH. The filling member RL may be completely surrounded by the second metal plate LP2 in a plan view. The filling member RL may be coupled to the fingerprint sensor 400 via the fifth coupling member AM5.

The fifth coupling member AM5 may be referred to as a coupling member between member sensors. The fingerprint sensor 400 may be disposed to overlap the filling member RL in the thickness direction. The fingerprint sensor 400 may be coupled to a bottom surface of the filling member RL and the bottom surface LP2a (see FIG. 8) of the second metal plate LP2 via the fifth coupling member AM5.

As shown in FIG. 5, the finger F may include a fingerprint, which is a surface facing the cover window 100. The fingerprint of the finger F may include depressions and prominences. The depressions and prominences of the fingerprint may be repeatedly arranged. In at least one section including one depression and one prominence taken among the repeated depressions and prominences, the prominence may be referred to as ridge RID and the depression may be referred to as valley VAL. The ridge RID of the fingerprint may be closer to the cover window 100 than the valley VAL. The manner of operation of the ultrasonic fingerprint sensor will be described with further reference to FIG. 7.

In some embodiments, separate layers may be further disposed between the metal plate LP and the protective layer PF. The layers may include at least one functional layer. The functional layer may be a layer that performs a heat dissipation function, an electromagnetic wave shielding function, a grounding function, a buffering function, a strength enhancing function, a support function, and/or a digitizing function.

Figure 7:
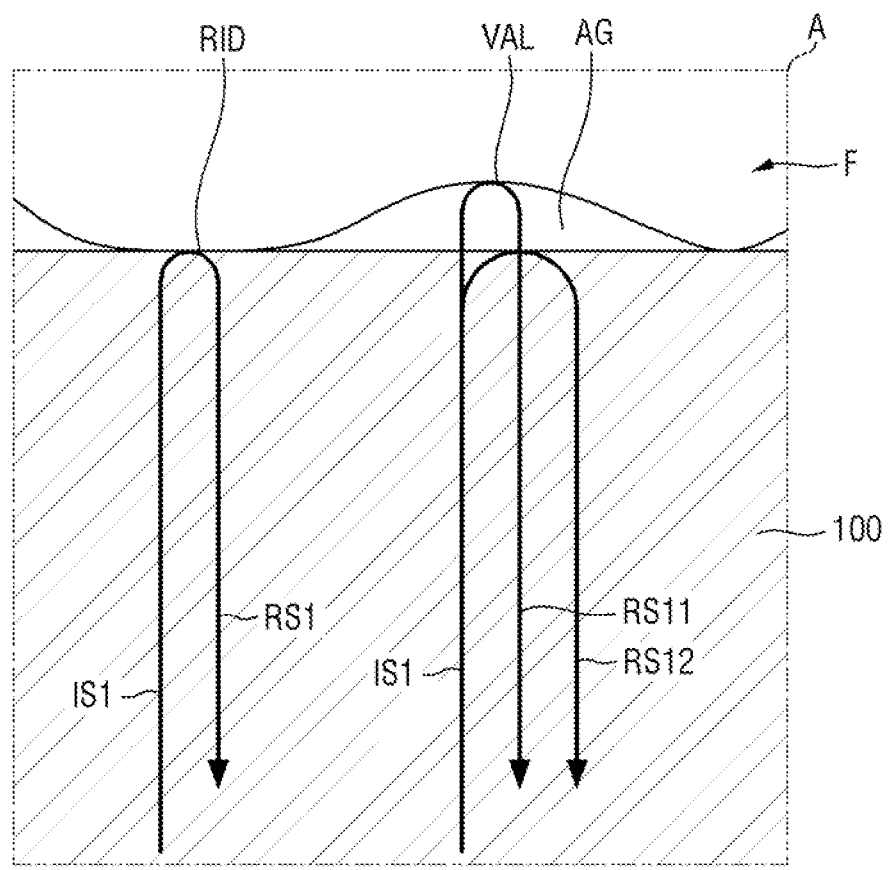
FIG. 7 is an enlarged cross-sectional view of portion A of FIG. 5.

FIG. 7 is an enlarged cross-sectional view of portion A of FIG. 5.

Referring to FIGS. 5 and 7, a first ultrasonic wave IS1 is cast to the ridge RID and the valley VAL of the fingerprint and then reflected by the ridge RID and the valley VAL. The first ultrasonic wave IS1 cast to the ridge RID may penetrate the fifth coupling member AMS, the filling member RL, the fourth coupling member AM4, the protective layer PF, the third coupling member AM3, the display panel 300, the first coupling member AM1, the polarization layer POL, the second coupling member AM2, and the cover window 100 to reach the ridge RID. As shown in FIG. 5, because the ridge RID directly contacts the cover window 100, there may be no gap, e.g., air gap AG, between the ridge RID and the cover window 100. Meanwhile, the first ultrasonic wave IS1 cast to the valley VAL may penetrate the fifth coupling member AMS, the filling member RL, the fourth coupling member AM4, the protective layer PF, the third coupling member AM3, the display panel 300, the first coupling member AM1, the polarization layer POL, the second coupling member AM2, the cover window 100, and the air gap AG to reach the valley VAL. The first ultrasonic wave IS1 cast to the valley VAL may further travel through the air cap AG compared to the first ultrasonic wave IS1 cast to the ridge RID. With regard to the first ultrasonic wave IS1 emitted by the ultrasonic fingerprint sensor 400, the first ultrasonic wave IS1 cast to the ridge RID may be converted into a first signal RS1 reflected by the ridge RID. Further, the first ultrasonic wave IS1 cast to the valley VAL and reflected by an interface between the air gap AG and the cover window 100 may be converted into a first reflection signal RS11, and the first ultrasonic wave IS1 cast to the valley VAL and reflected by the valley VAL may be converted into a second reflection signal RS12, the first and second reflection signals RS11 and RS12 constituting the first signal RS1. The magnitude of the first reflection signal RS11 may be greater than that of the second reflection signal RS12.

The ultrasonic fingerprint sensor 400 may recognize the ridge RID and the valley VAL based on a first time difference between an emission time point of the first ultrasonic wave IS1 and an arrival time point of the first signal RS1 reflected by the ridge RID and a second time difference between the emission time point of the first ultrasonic wave IS1 and arrival time points of the first signal RS1 reflected by the valley VAL and the interface between the air gap AG and the cover window 100. However, given the existence of the air gap AG between the valley VAL and the cover window 100 and the ultrasonic wave propagation speed varying with medium, it might not be easy to distinguish between the ridge RID and the valley VAL based on the first time difference and the second time difference.

In order to factor in the air gap AG between the valley VAL and the cover window 100 for more accurate distinction between the ridge RID and the valley VAL, a ratio between the strength of the first ultrasonic wave IS1 and the strength of the first signal RS1 may be calculated as a method of distinguishing between the ridge RID and the valley VAL. The ratio of the strength of the first signal RS1 to the strength of the first ultrasonic wave IS1 is defined as reflection coefficient R. For example, the reflection coefficient R of the first ultrasonic wave IS1 cast to the valley VAL may be greater than the reflection coefficient R of the first ultrasonic wave IS1 cast to the ridge RID. For example, whether it is the ridge RID or the valley VAL may be determined based on the reflection coefficient R of the first ultrasonic wave IS1.

Referring back to FIG. 5, when the metal plate LP is disposed on a path of the first ultrasonic wave IS1 emitted upward from the fingerprint sensor 400 and/or the first signal RS1 reflected from the fingerprint of the finger F, the strength of the first ultrasonic wave IS1 and the strength of the first signal RS1 may be reduced. Thus, in the display device, according to an embodiment, the metal plate LP may be partially recessed on the path of the first ultrasonic wave IS1 emitted upward from the fingerprint sensor 400 and/or the first signal RS1 reflected from the fingerprint of the finger F.

The recess IH may be formed by etching process. For example, the recess IH is formed through dry etching process. In this case, surface roughness may be formed (see FIG. 8) on a surface (or a bottom surface) of the second metal plate LP2 on which the recess IH is formed. When the fingerprint sensor 400 is disposed on the surface of the second metal plate LP2 on which the recess IH having surface roughness formed thereon, distortion of the first ultrasonic wave IS1 and the first signal RS1 of the fingerprint sensor 400 may occur. However, in the case of the display device 10, according to an embodiment, by disposing the filling member RL between the recess IH and the fingerprint sensor 400, the distortion of the first ultrasonic wave IS1 emitted and reflected from the fingerprint sensor 400 and the first signal RS1 may be corrected by the filling member RL.

Further, unlike the metal plate LP shown in FIG. 5, the fingerprint sensor 400 is not necessarily disposed flat but is inclined at a predetermined angle with an extending direction (horizontal direction) of the metal plate LP. In the process of attaching the fingerprint sensor 400 to the second metal plate LP2 via the fifth coupling member AM5, the fingerprint sensor 400 inclined at the predetermined angle may be disposed to extend in the same direction as the extending direction (or horizontal direction) of the metal plate LP. However, in the process of disposing the inclined fingerprint sensor 400 to be flat, a predetermined stress may be generated. When the stress is directly transferred to the second metal plate LP2 to which the fingerprint sensor 400 is attached, the corresponding area of the second metal plate LP2 to which the fingerprint sensor 400 is attached may be bent by the provided stress. However, in one embodiment, the filling member RL between the second metal plate LP2 and the fingerprint sensor 400 may alleviate the stress. The stress alleviation capability of the filling member RL may be provided by adjusting modulus of the filling member RL. The modulus of the filling member RL tends to be proportional to the hardness of the filling member RL, and the hardness of the filling member RL may be approximately 10 times greater than the hardness of the fifth coupling member AM5. For example, the hardness of the filling member RL may be 20 times or 30 times greater than the hardness of the fifth coupling member AM5. For example, the hardness of the filling member RL may be 0.8 GPa or more, but is not necessarily limited thereto.

In addition, in the display device 10, according to an embodiment, the recess IH may be filled with the filling member RL having a hardness greater than that of the fifth coupling member AM5 and the fingerprint sensor 400 may be attached to the bottom surface of the filling member RL via the fifth coupling member AM5. Therefore, the protective layer PF and/or the display panel 300 may be prevented from being deformed and the recess IH may be prevented from being visible from outside the display device 10.

The filling member RL may include materials known in the art that can be filled into the recess IH. For example, the filling member RL may include a material that can be filled in the groove IH by an injection method, an attachment method, and the like. According to an embodiment, the filling member RL is formed in the recess IH using an injection method.

The filling member RL may be made of acrylonitrile butadiene styrene copolymer (ABS), polycarbonate (PC), or the like, without necessarily being limited thereto. The hardness of the filling member RL may be smaller than the hardness of the adjacent second metal plate LP2.

Further, the filling member RL is located on the path of the first ultrasonic wave IS1 emitted from the fingerprint sensor 400 and is set to a frequency range that transmits well through the display panel 300. Therefore, to increase sensing efficiency of the fingerprint sensor 400, the filling member RL may have an impedance similar to that of the display panel 300. For example, the impedance of the filling member RL may be set within an error of approximately 5 MPa*m/s*10^−6 of the impedance of the display panel 300.

In some embodiments, when the ultrasonic fingerprint sensor is applied, the filling member RL may further include a black-based colorant (e.g., a black die). As the filling member RL further includes the black-based colorant, the fingerprint sensor 400 may be prevented from being visible from outside.

When an optical fingerprint sensor is applied as the fingerprint sensor 400, the filling member RL may have the same hardness and material as those of the filling member RL used for the ultrasonic fingerprint sensor. However, since the optical fingerprint sensor recognizes a fingerprint through light, the filling member RL may be designed by taking into account the transmittance for the light. The filling member RL for the optical fingerprint sensor may have a transmittance of approximately 90% for the light. The light may include visible light, ultraviolet light, and/or infrared light.

Figure 8:
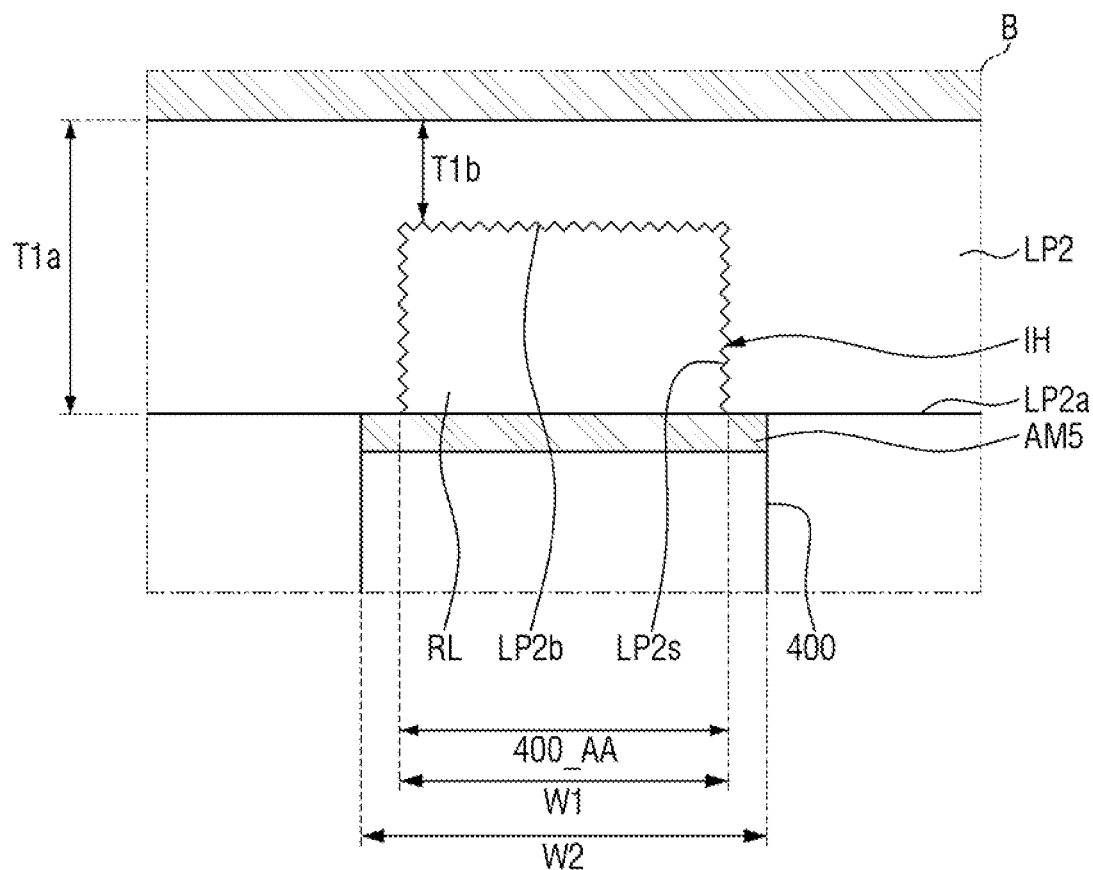
FIG. 8 is an enlarged cross-sectional view of portion B of FIG. 5.

FIG. 8 is an enlarged cross-sectional view of portion B of FIG. 5.

Referring to FIGS. 5 and 8, the second metal plate LP2 may include the recess IH recessed in a direction from the surface LP2a of the second metal plate LP2 toward the other surface (a surface facing the fourth coupling member AM4). The thickness T1b of the second metal plate LP2 in which the recess IH is formed may be 20% to 60% of the thickness T1a of the metal plate LP2 in which the recess IH is not formed. For example, the thickness T1b of the second metal plate LP2 in which the recess IH is formed may be 30% to 40% of the thickness T1a of the second metal plate LP2 in which the recess IH is not formed, but is not necessarily limited thereto. According to an embodiment, the recess IH partially recessed in the second metal plate is formed without disposing the fingerprint sensor 400 within a through hole completely penetrating the second metal plate LP2, and the fingerprint sensor 400 is disposed in the recess IH, thereby minimizing the deformation of the display panel 300 in the process of attaching the fingerprint sensor 400.

The width W2 of the fingerprint sensor 400 may be greater than the width W1 of the recess IH, and the fingerprint sensor 400 may overlap the second metal plate LP2, in which the recess IH is not formed, in the thickness direction.

As described above, the recess IH of the second metal plate LP2 may be formed by etching. Thus, the roughness of the surface LP2b of the second metal plate LP2 on which the recess IH is formed may be greater than the roughness of the surface LP2a of the second metal plate LP2 on which the recess IH is not formed.

The fingerprint sensor 400 includes an active area 400_AA which transmits the first ultrasonic wave IS1 and receives the first signal RS1. A periphery of the active area 400_AA may be defined as a non-active area. As shown in FIG. 8, the active area 400_AA may overlap the recess IH in the thickness direction.

Hereinafter, other embodiments will be described.

Figure 9:
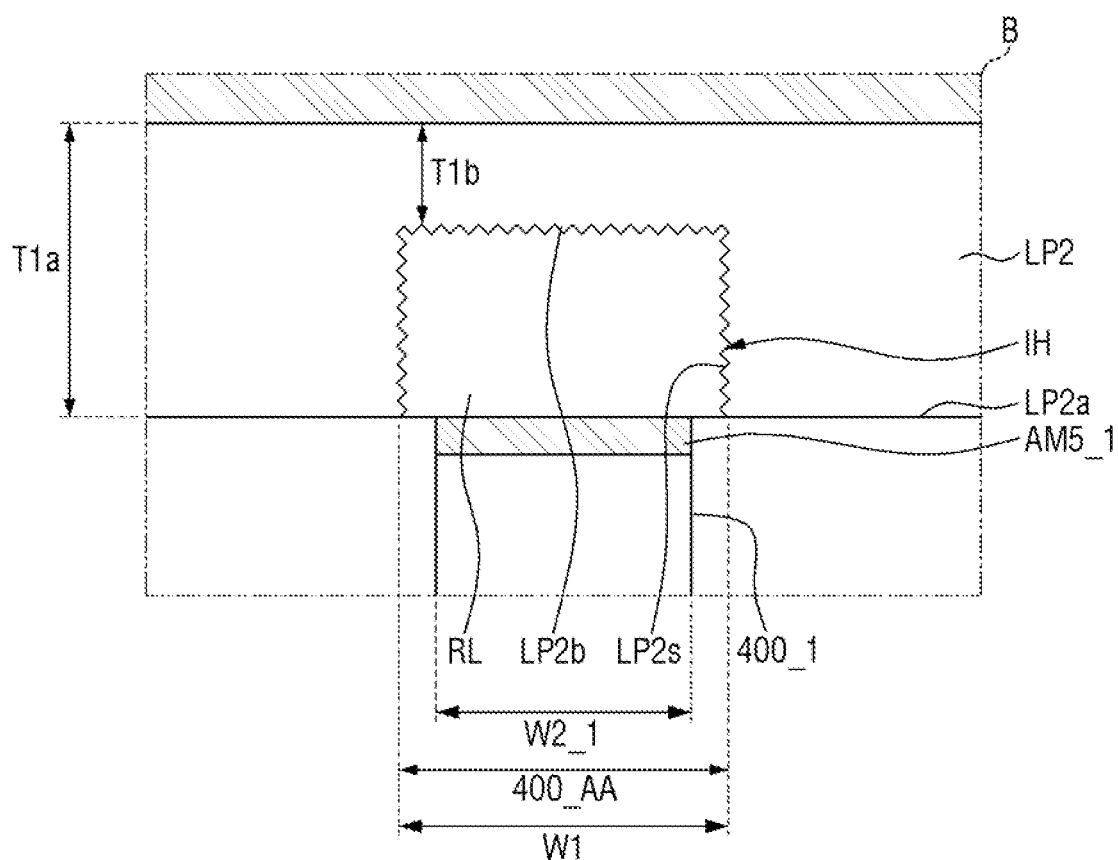
FIG. 9 is a partial cross-sectional view of a display device according to an embodiment of the present disclosure.

FIG. 9 is a partial cross-sectional view of a display device according to an embodiment of the present disclosure.

Referring to FIG. 9, a display device, according to the present embodiment, is different from the display device of FIG. 8 in that the width W2_1 of a fingerprint sensor 400_1 of the display device is smaller than the width W1 of a recess IH. A fifth coupling member AM5_1 disposed between the fingerprint sensor 400_1 and a filling member RL may be smaller than the width W1 of the recess IH.

The other components may be understood to be at least similar to corresponding components that have been described above with reference to FIG. 8.

Figure 10:
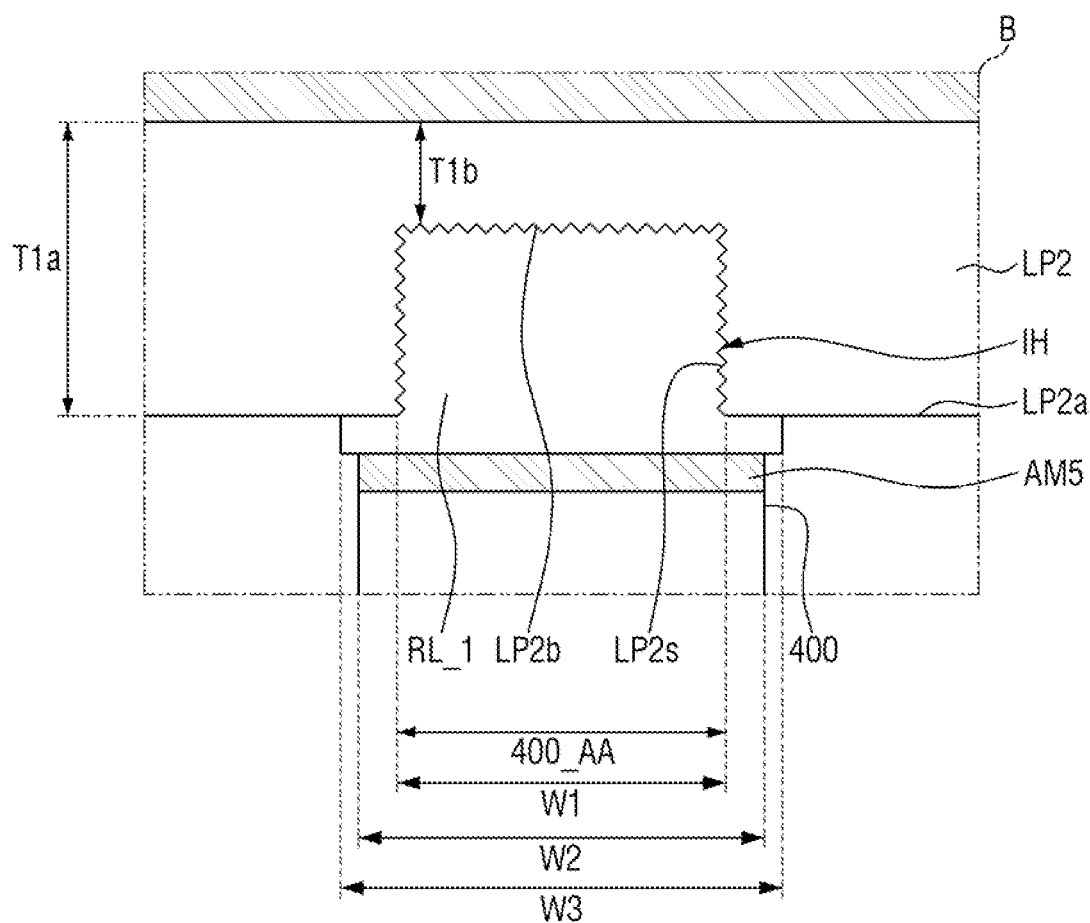
FIG. 10 is a partial cross-sectional view of a display device according to an embodiment of the present disclosure.

FIG. 10 is a partial cross-sectional view of a display device according to an embodiment of the present disclosure.

Referring to FIG. 10, a display device, according to the present embodiment, is different from the display device of FIG. 8 in that a filling member RL_1 overlaps a surface LP2a of a second metal plate LP2 on which a recess IH is not formed.

For example, in cross-sectional view, a bottom surface of the filling member RL_1 may be located lower (protruding downward) than the surface LP2a of the second metal plate LP2 on which the recess IH is not formed. The width W3 of a portion of the filling member RL_1 located lower than the surface LP2a of the second metal plate LP2 on which the recess IH is not formed may be identical to, greater than, or smaller than the width W1 of the fingerprint sensor 400, but may be greater than the width W1 of the filling member RL_1 filled in the recess IH.

The other components may be understood to be at least similar to corresponding components that have been described above with reference to FIG. 8.

Figure 11:
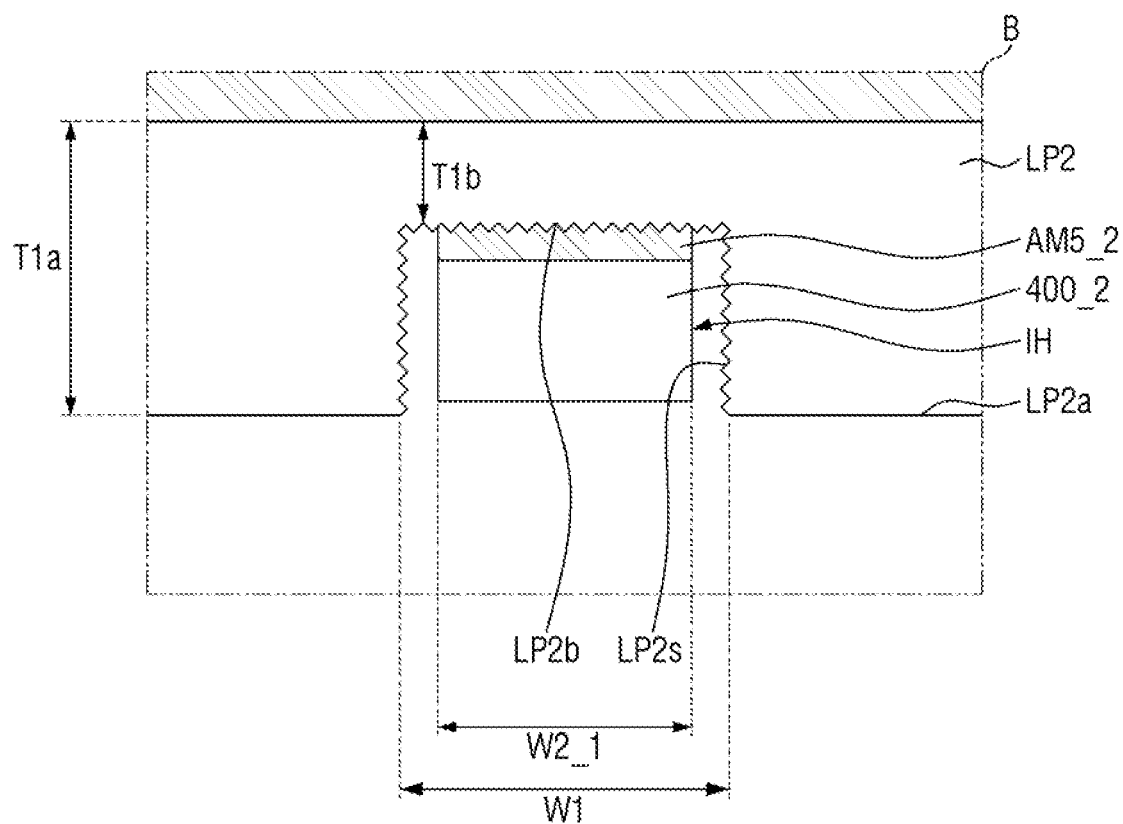
FIG. 11 is a schematic plan view of a filling member and a second metal plate according to an embodiment of the present disclosure.

FIG. 11 is a schematic plan view of a filling member and a second metal plate according to an embodiment of the present disclosure.

Referring to FIG. 11, a display device according to the present embodiment is different from the display device including the filling member RL of FIG. 8 in that a fingerprint sensor 400_2 is disposed on a surface LP2b of a second metal plate LP2, on which a recess IH is formed, through a fifth coupling member AM5_2. For example, the width W2_1 of the fingerprint sensor 400_2 may be smaller than the width W1 of the recess IH. For example, the fingerprint sensor 400_2 may be directly disposed on the surface LP2b of the second metal plate LP2, on which the recess IH is formed, through the fifth coupling member AM5_2. The other components may be understood to be at least similar to corresponding components that have been described above with reference to FIG. 8.

Figure 12:
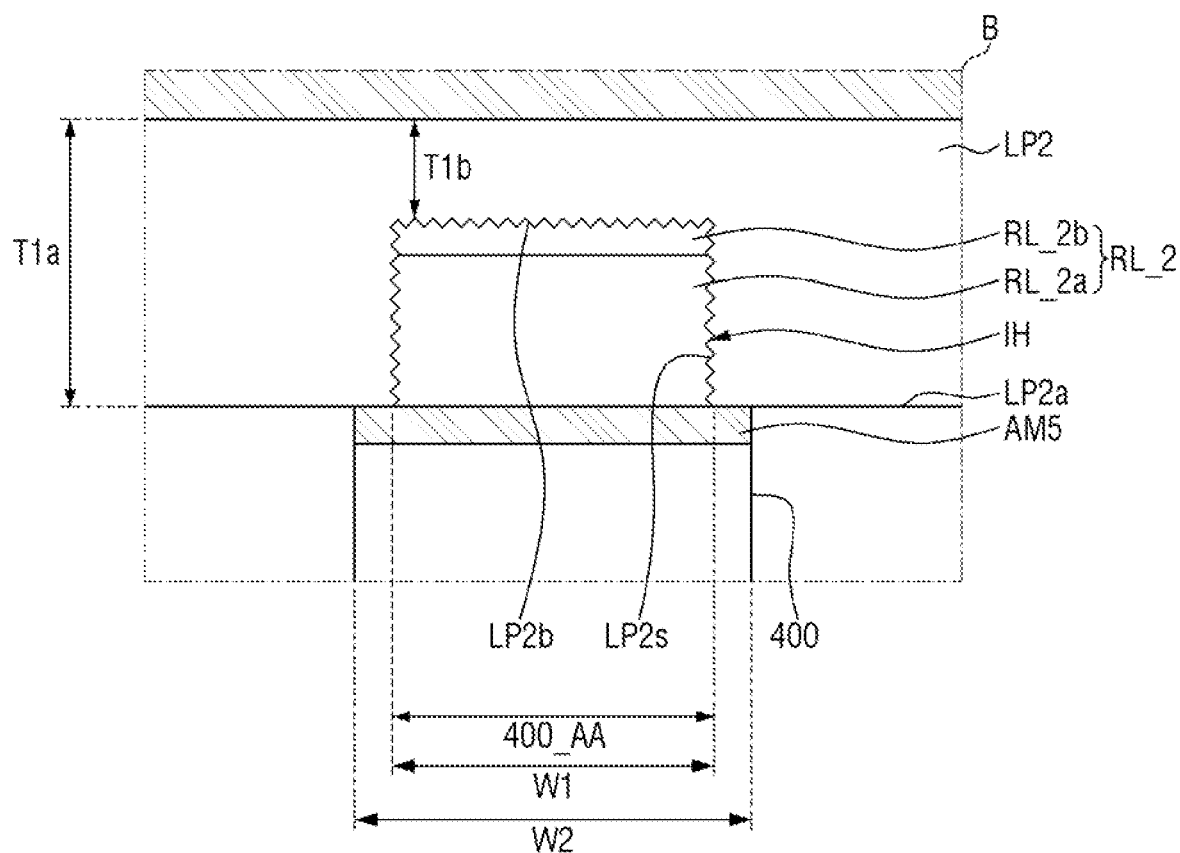
FIG. 12 is a partial cross-sectional view of a display device according to an embodiment of the present disclosure.

FIG. 12 is a partial cross-sectional view of a display device according to an embodiment of the present disclosure.

Referring to FIG. 12, a display device, according to the present embodiment, is different from the filling member RL of FIG. 8 in that a filling member RL_2 is divided into two or more different portions having different hardnesses.

For example, the filling member RL_2 may have a first portion RL_2a having physical properties of the filling member RL of FIG. 8 and a second portion RL_2b disposed between a second metal plate LP2 and the first portion RL_2a. The second portion RL_2b may have a greater hardness than the first portion RL_2a.

As described above with reference to FIG. 5, a predetermined stress may be generated in the process of disposing the inclined fingerprint sensor 400 to be flat. When the stress is directly transferred to the second metal plate LP2 to which the fingerprint sensor 400 is attached, the corresponding area of the second metal plate LP2 to which the fingerprint sensor 400 is attached may be bent by the provided stress. However, in the present embodiment, the filling member RL_2 includes the first portion RL_2a having physical properties of the filling member RL of FIG. 8 and the second portion RL_2b disposed between the second metal plate LP2 and the fifth coupling member AM5 and the second portion RL_2b has a hardness greater than the first portion RL_2a. Thus, the second portion RL_2b may better alleviate the stress than the first portion RL2a. The hardness of the second portion RL_2b may be 1.0 GPa or more, but is not necessarily limited thereto.

Figure 13:
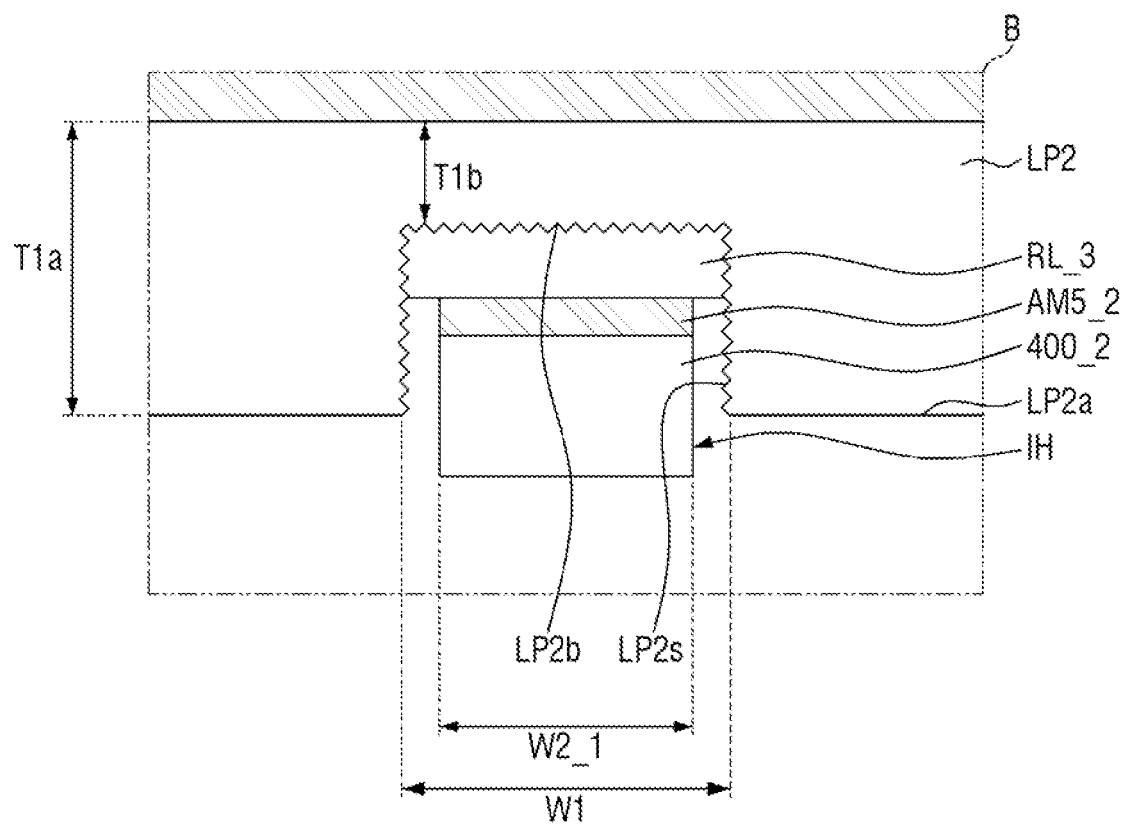
FIG. 13 is a partial cross-sectional view of a display device according to an embodiment of the present disclosure.

FIG. 13 is a partial cross-sectional view of a display device according to an embodiment of the present disclosure.

Referring to FIG. 13, a display of the present embodiment may be different from the display device of FIG. 11 in that a filling member RL_2 can be disposed between a fifth coupling member AM5_2 and a surface LP2b of a second metal plate LP2.

For example, the filling member RL_2 may be disposed between the fifth coupling member AM5_2 and the surface LP2b of the second metal plate LP2. The filling member RL_2 may be in direct contact with the surface LP2b of the second metal plate LP2 and in direct contact with a side surface LP2s of the second metal plate LP2. The filling member RL_2 may partially expose a lower portion of the side surface LP2s of the second metal plate LP2.

The width W2_1 of the fingerprint sensor 400_2 may be smaller than the width W1 of the recess IH. For example, the fingerprint sensor 400_2 may be attached to the filing member RL_2 via the fifth coupling member AM5_2. The other components may be understood to be at least similar to corresponding components that have been described above with reference to FIG. 11.

According to the display device including the fingerprint sensor, in accordance with the embodiments, it is possible to minimize deformation of a display panel at the time of attaching the fingerprint sensor and to increase durability.

However, the effects of the embodiments are not necessarily restricted to the one set forth herein.

What is claimed:

1. A display device, comprising:
a display panel;
a metal plate disposed on a bottom surface of the display panel, the metal plate saving a first surface facing the bottom surface of the display panel, a second surface facing away from the display panel, and a recess disposed on the second surface of the metal plate;
a fingerprint sensor disposed on the second surface of the metal plate, overlapping the recess of the metal plate; and
a filling disposed between the metal plate and the fingerprint sensor,
wherein the metal plate and the filling include different materials from each other and the filling fills a volume of the recess.

2. The display device of claim 1, wherein the filling includes acrylonitrile butadiene styrene copolymer (ABS) and/or polycarbonate (PC).

3. The display device of claim 1, further comprising a coupling disposed between the fingerprint sensor and the filling and configured to couple the fingerprint sensor and the filling to each other.

4. The display device of claim 3, wherein a hardness of the filling is greater than a hardness of the coupling.

5. The display device of claim 4, wherein the hardness of the filling is 10 times greater than the hardness of the coupling.

6. The display device of claim 5, wherein the hardness of the filling is 0.8 GPa or more.

7. The display device of claim 1, wherein a thickness of the recess is 20% to 60% of a maximum thickness of the metal plate.

8. The display device of claim 1, wherwin a width of the fingerprint sensor is greater than a width of the recess.

9. The display device of claim 8, wherein the fingerprint sensor additionally overlaps a portion of the metal plate that is not overlapped by the recess.

10. The display device of claim1, wherein a width of the fingerprint sensor is smaller than a width of the recess.

11. The display device of claim 1, wherein the filling additionally overlaps a portion of the metal plate that is not overlapped by the recess.

12. The display device of claim 1, wherein the filling comprises a first portion and a second portion disposed between the first portion and the metal plate and a hardness of the second portion is greater than a hardness of the first portion.

13. The display device of claim 1, wherein the fingerprint sensor comprises an ultrasonic fingerprint sensor and the ultrasonic fingerprint sensor is configured to perform fingerprint recognition by comparing an incident ultrasonic wave incident upward from the ultrasonic fingerprint sensor and a fingerprint reflected ultrasonic wave reflected from a fingerprint.

14. The display device of claim 1, wherein the fingerprint sensor comprises an optical fingerprint sensor and the filling has a transmittance of about 90% for visible light, ultraviolet light, or infrared light.

15. The display device of claim 1, wherein a roughness of the second surface of the metal plate in which the recess is formed is greater than a roughness of the first surface of the metal plate in which the recess is not formed.

16. A display device, comprising:
a display panel;
a metal plate disposed on a bottom surface of the display panel and comprising a top surface facing the bottom surface of the display panel and a bottom surface opposite to the top surface; and
a fingerprint sensor disposed on the bottom surface of the metal plate,
wherein the metal plate comprises a recess recessed in a direction from the bottom surface of the metal plate in a direction toward the top surface of the metal plate,
wherein the fingerprint sensor overlaps the recess,
wherein a roughness of the bottom surface of the metal plate where the recess is formed is greater than a roughness of the bottom surface of the metal plate where the recess is not formed, and
wherein a folding area and a non-folding area in a periphery of the folding area are defined in the display panel and the fingerprint sensor overlaps the non-folding area.

17. The display device of claim 16, further comprising:
a filling disposed between the metal plate and the fingerprint sensor; and
a coupling disposed between the fingerprint sensor and the filling and configured to couple the fingerprint sensor and the filling to one another.

18. The display device of claim 17, wherein a hardness of the filling is greater than a hardness of the coupling.

19. The display device of claim 16, wherein a width of the fingerprint sensor is smaller than a width of the recess.

20. The display device of claim 17, wherein the filling comprises a first portion and a second portion disposed between the first portion and the metal plate, and a hardness of the second portion is greater than a hardness of the first portion.

* * * * *